(12) United States Patent
Mutsura et al.

(10) Patent No.: US 11,745,668 B2
(45) Date of Patent: Sep. 5, 2023

(54) SPEAKER DISPOSITION STRUCTURE OF VEHICLE

(71) Applicant: Mazda Motor Corporation, Hiroshima (JP)

(72) Inventors: Kiyoshi Mutsura, Aki-gun (JP); Kouki Hirao, Aki-gun (JP); Koji Wakamatsu, Aki-gun (JP); Hiroshi Yamanaka, Aki-gun (JP); Mayumi Fujimoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 112 days.

(21) Appl. No.: 17/480,148

(22) Filed: Sep. 21, 2021

(65) Prior Publication Data

US 2022/0089098 A1 Mar. 24, 2022

(30) Foreign Application Priority Data

Sep. 23, 2020 (JP) .................................. 2020-158370

(51) Int. Cl.
*B60R 11/02* (2006.01)
*H04R 1/02* (2006.01)
*B60R 11/00* (2006.01)

(52) U.S. Cl.
CPC ............ *B60R 11/0217* (2013.01); *H04R 1/02* (2013.01); *B60R 2011/0022* (2013.01); *H04R 2499/13* (2013.01)

(58) Field of Classification Search
CPC ......... B60R 11/0217; B60R 2011/0022; B60R 13/0815; H04R 1/02; H04R 2499/13
See application file for complete search history.

(56) References Cited

U.S. PATENT DOCUMENTS

| | | | | |
|---|---|---|---|---|
| 5,629,502 A | * | 5/1997 | Nakano ................ | H04R 1/2842 181/156 |
| 6,389,147 B1 | * | 5/2002 | Rush ........................ | H04R 5/02 381/86 |
| 9,386,376 B2 | * | 7/2016 | Tada ....................... | H04R 9/022 |
| 9,517,732 B2 | * | 12/2016 | Silzle ..................... | H04R 1/025 |
| 10,531,170 B2 | * | 1/2020 | Kajihara .................. | H04R 7/16 |

(Continued)

FOREIGN PATENT DOCUMENTS

| | | | | |
|---|---|---|---|---|
| JP | 2001339784 A | * | 12/2001 | ............... H04R 1/02 |
| JP | 3752686 B2 | * | 3/2006 | ............. B60R 11/02 |

(Continued)

*Primary Examiner* — Oyesola C Ojo
(74) *Attorney, Agent, or Firm* — XSENSUS LLP

(57) ABSTRACT

A speaker disposition structure of a vehicle comprises a left hinge pillar and a right hinge pillar both extending in a vehicle up-down direction; a speaker box fixed to a lower portion of one of the left and right hinge pillars, and the speaker box having a closed inner space; and a partition located on a vehicle width direction inner side of the speaker box. A port opening connects with the inner space of the speaker box and is located in a front face of the speaker box. A space portion is surrounded by the front face of the speaker box, the dash panel, the hinge pillar, and the partition. The space portion connects with an occupant space of the space portion. A length of the space portion, from the port opening in a front-rear direction of the vehicle, is greater than a maximum length of the port opening.

17 Claims, 14 Drawing Sheets

(56) References Cited

U.S. PATENT DOCUMENTS

| | | | |
|---|---|---|---|
| 11,445,292 B2* | 9/2022 | Honji | B60J 5/0413 |
| 2005/0013459 A1* | 1/2005 | Maekawa | B60R 11/0217 |
| | | | 381/349 |
| 2008/0150324 A1* | 6/2008 | Jayasuriya | B60R 11/0217 |
| | | | 296/187.12 |
| 2010/0135516 A1* | 6/2010 | Saiki | H04R 1/2811 |
| | | | 340/602 |
| 2013/0043089 A1* | 2/2013 | Rodgers | H04R 1/2826 |
| | | | 181/144 |
| 2016/0068199 A1* | 3/2016 | Matthiessen | B62D 25/02 |
| | | | 296/181.1 |

FOREIGN PATENT DOCUMENTS

| | | | |
|---|---|---|---|
| JP | 2018-167709 A | 11/2018 | |
| WO | WO-2018180089 A1 * | 10/2018 | B60R 11/02 |

* cited by examiner

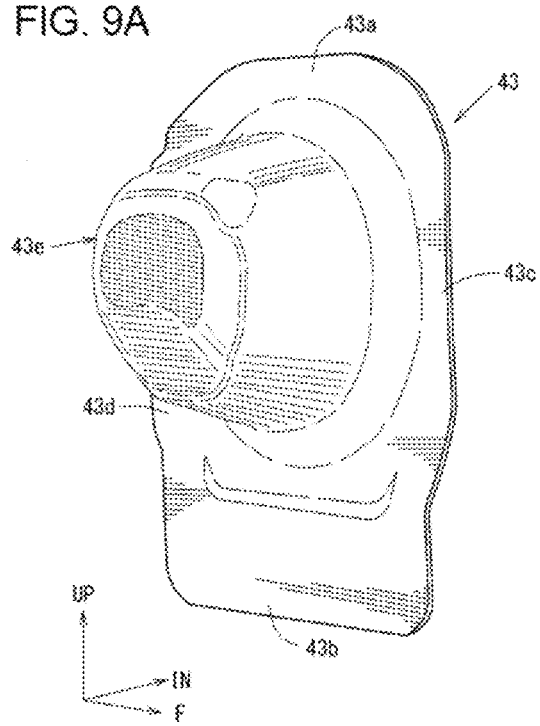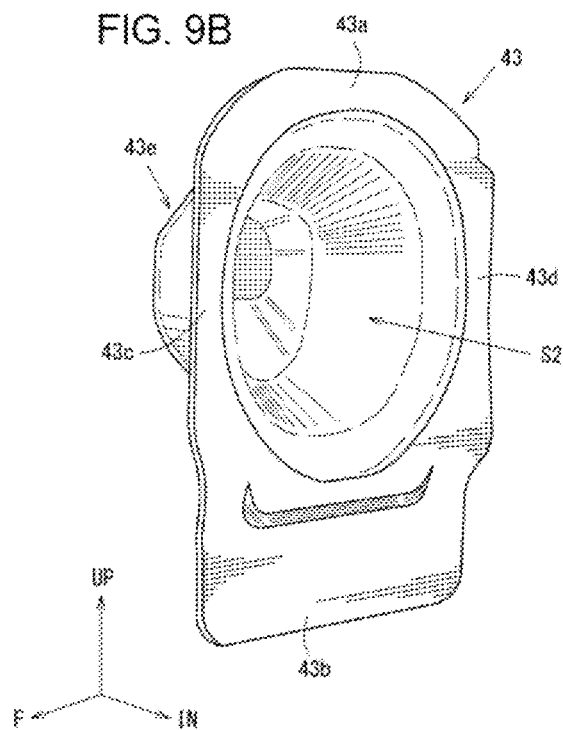

SPEAKER DISPOSITION STRUCTURE OF VEHICLE

CROSS-REFERENCE TO RELATED APPLICATION

The present application claims priority to JP 2020-158370, filed in Japan on Sep. 23, 2020, the entire disclosure of which is incorporated herein by reference.

TECHNICAL FIELD

The present disclosure relates to a speaker disposition structure of a vehicle, more specifically to a speaker disposition structure of a vehicle, including: a pair of left and right hinge pillars extending in a vehicle up-down direction; a dash panel connecting front portions of the pair of left and right hinge pillars to each other in a vehicle width direction; a speaker box that holds a speaker, is fixed to a lower portion of the hinge pillar, and has a closed inner space; and a partition member located on a vehicle-width-direction inner side of the speaker box.

BACKGROUND

Conventionally, there is a structure for mounting a speaker box on a hinge pillar at an occupant foot location. As the speaker box, when a bass reflex type speaker box is adopted, the hinge pillar is usually covered with a side trim, and therefore, if a port opening is arranged to face the inside of a vehicle cabin similarly to a speaker, the port opening is covered with the side trim, and a sound produced from the port opening is blocked by the side trim. Consequently, the transmission of a reproduced sound from the port to the cabin is impeded.

Moreover, in order to prevent the cabin from being cramped by the speaker box, when the vehicle-interior-side face of the speaker box and the side trim are arranged in close proximity and the port opening is arranged to face the inside of the vehicle cabin as described above, a mass of air from the port opening flows through a narrow space between the vehicle-interior-side face of the speaker box and the side trim, and causes wind noise. In order to transmit the reproduced sound from the port to the cabin and prevent occurrence of wind noise, it is considered to mount a grill as a lattice structure on the side trim, but, since the speaker box is arranged at the occupant foot location, water and mud may splash on the port opening, resulting in a new problem of inducing a failure of the speaker.

SUMMARY

A speaker disposition structure of a vehicle according to the present disclosure includes a left hinge pillar and a right hinge pillar, both extending in a vehicle up-down direction, the left hinge pillar including a left dash panel connecting front portion and the right hinge pillar including a right dash panel connecting front portion, the left dash panel connecting front portion and the right dash panel connecting front portion connecting to each other in a vehicle width direction; a speaker box that holds a speaker, the speaker box being fixed to a lower portion of one of the left and right hinge pillars, and the speaker box having a closed inner space; and a partition located on a vehicle width direction inner side of the speaker box. A port opening connects with the inner space of the speaker box and is located in a front face of the speaker box. The speaker disposition structure further includes a space portion that is surrounded by the front face of the speaker box, the dash panel, the hinge pillar, and the partition. The space portion connects with an occupant space on an upper or lower side of the space portion. A length of the space portion, from the port opening in a front-rear direction of the vehicle, is greater than a maximum length of the port opening.

BRIEF DESCRIPTION OF DRAWINGS

FIG. 9A is a perspective view of an outer-side box part as viewed from the front and outside of the vehicle, and FIG. 9B is a perspective view of the outer-side box part as viewed from the front and inside of the vehicle.

DETAILED DESCRIPTION OF THE DRAWINGS

Figure 1:
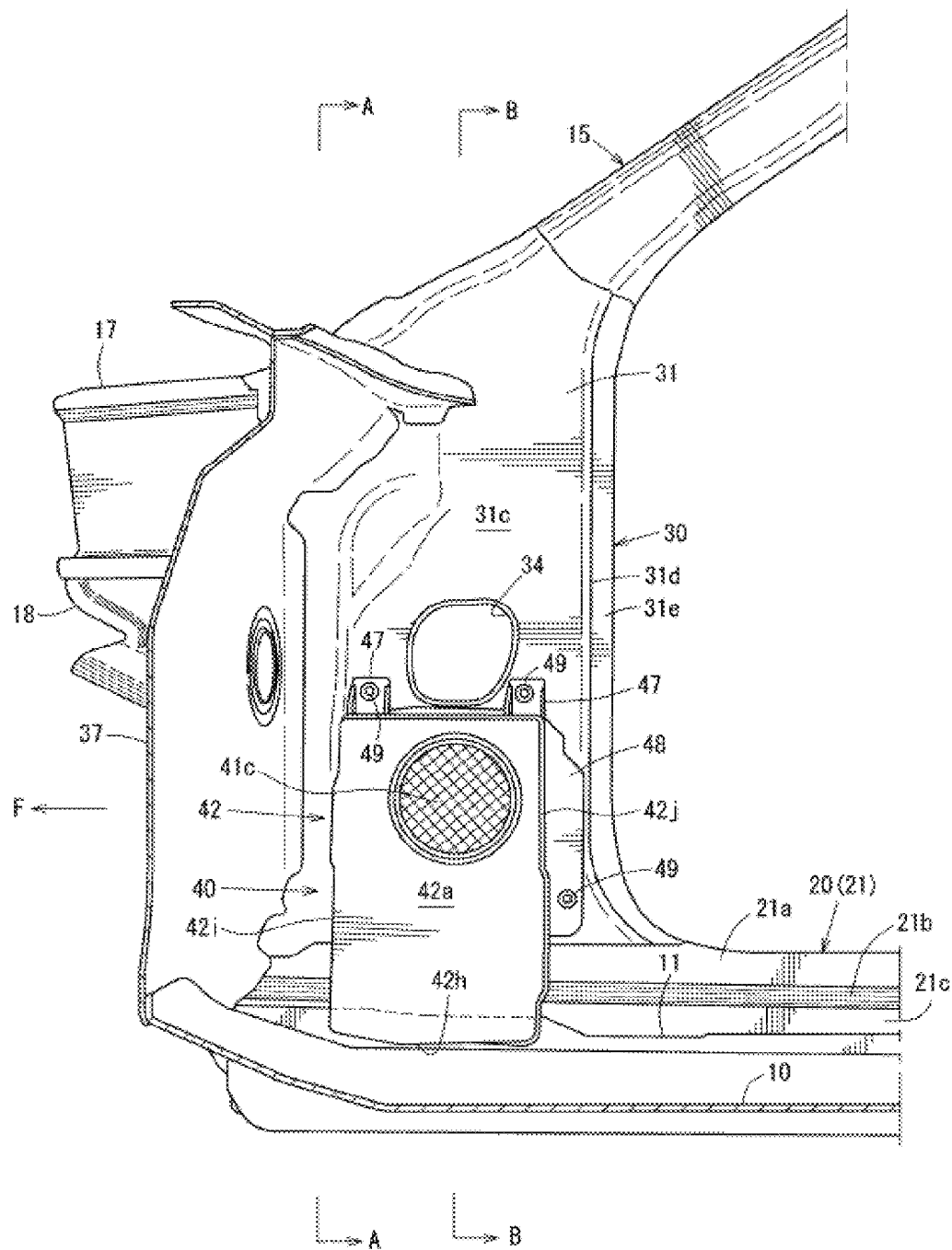
FIG. 1 is a side view of a speaker disposition structure of a vehicle of the present disclosure as viewed from an inside of a vehicle cabin.

The inventors of the present disclosure have recognized problems with conventional speaker disposition structures. Thus, the inventors have developed new technologies for speaker disposition structures that make it possible to transmit a reproduced sound from a port opening (a reproduced sound from a port) to a cabin, prevent water and mud from splashing on the port opening, and prevent occurrence of wind noise due to movement of air flowing from the port opening.

A speaker disposition structure of a vehicle according to the present disclosure includes: a pair of left and right hinge pillars extending in a vehicle up-down direction; a dash panel connecting front portions of the pair of left and right hinge pillars to each other in a vehicle width direction; a speaker box that holds a speaker, is fixed to a lower portion of the hinge pillar, and has a closed inner space; and a partition member located on the vehicle-width-direction inner side of the speaker box, wherein a port opening communicating with the inner space of the speaker box is formed in a front face of the speaker box, a space portion surrounded by the front face of the speaker box, the dash panel, the hinge pillar, and the partition member is formed, the space portion is arranged to communicate with an occupant space, on the upper or lower side thereof, and a front-rear-direction dimension of the space portion, from the port opening, is set at least greater than a maximum dimension of the port opening.

The speaker box may be a bass reflex type speaker box, and the partition member may be a floor mat.

According to this configuration, since the port opening is formed in the front face of the speaker box, the port opening is not closed by the partition member, thereby preventing a reproduced sound from the port from being blocked by the partition member.

Moreover, since the space portion communicates with the occupant space, the reproduced sound from the port opening can be transmitted to the cabin.

Further, since the space portion is constituted by the partition member, it is possible to prevent water and mud from splashing on the port opening.

Furthermore, since the front-rear-direction dimension of the space portion, from the port opening, is at least greater than the maximum dimension of the port opening, it is possible to prevent occurrence of wind noise due to movement of air flowing from the port opening.

In one embodiment of the present disclosure, the partition member is formed by the floor mat placed from above a floor panel to the vehicle-width-direction inner side of the speaker box.

According to this configuration, it is possible to form the partition member by effectively utilizing an existent vehicle component (floor mat), without separately providing another member.

In one embodiment of the present disclosure, the space portion is formed from the lower side of the speaker box to the vicinity of the upper end location of the speaker box.

According to this configuration, even when the port opening is formed at any height position in the up-down direction in the front face of the speaker box, the reproduced sound from the port can be transmitted to the cabin.

In one embodiment of the present disclosure, the partition member that forms the space portion is disposed such that, in front of the port opening, the partition member is inclined inward in the vehicle width direction, towards the front of the vehicle in plan view.

According to this configuration, since it is possible to secure the capacity of the space portion, occurrence of wind noise due to movement of air flowing from the port opening can be reliably prevented.

A speaker disposition structure in accordance with the present disclosure provides advantageous effects, such as transmitting a reproduced sound from the port opening (the reproduced sound from the port) to the cabin, preventing water and mud from splashing on the port opening, and further preventing occurrence of wind noise due to movement of air flowing from the port opening.

Such features allow for transmitting a reproduced sound from the port opening (the reproduced sound from the port) to the cabin, preventing water and mud from splashing on the port opening, and further preventing occurrence of wind noise due to movement of air flowing from the port opening is realized by a speaker disposition structure of a vehicle, including: a pair of left and right hinge pillars extending in the vehicle up-down direction; a dash panel connecting front portions of the pair of left and right hinge pillars to each other in the vehicle width direction; a speaker box that holds a speaker, is fixed to a lower portion of the hinge pillar, and has a closed inner space; and a partition member located on the vehicle-width-direction inner side of the speaker box, wherein a port opening communicating with the inner space of the speaker box is formed in the front face of the speaker box, a space portion surrounded by the front face of the speaker box, the dash panel, the hinge pillar, and the partition member is formed, the space portion is arranged to communicate with an occupant space, on the upper or lower side thereof, and a front-rear-direction dimension of the space portion from the port opening is set at least greater than a maximum dimension of the port opening.

One embodiment of the present disclosure will be described in detail below, based on the drawings.

Figure 2:
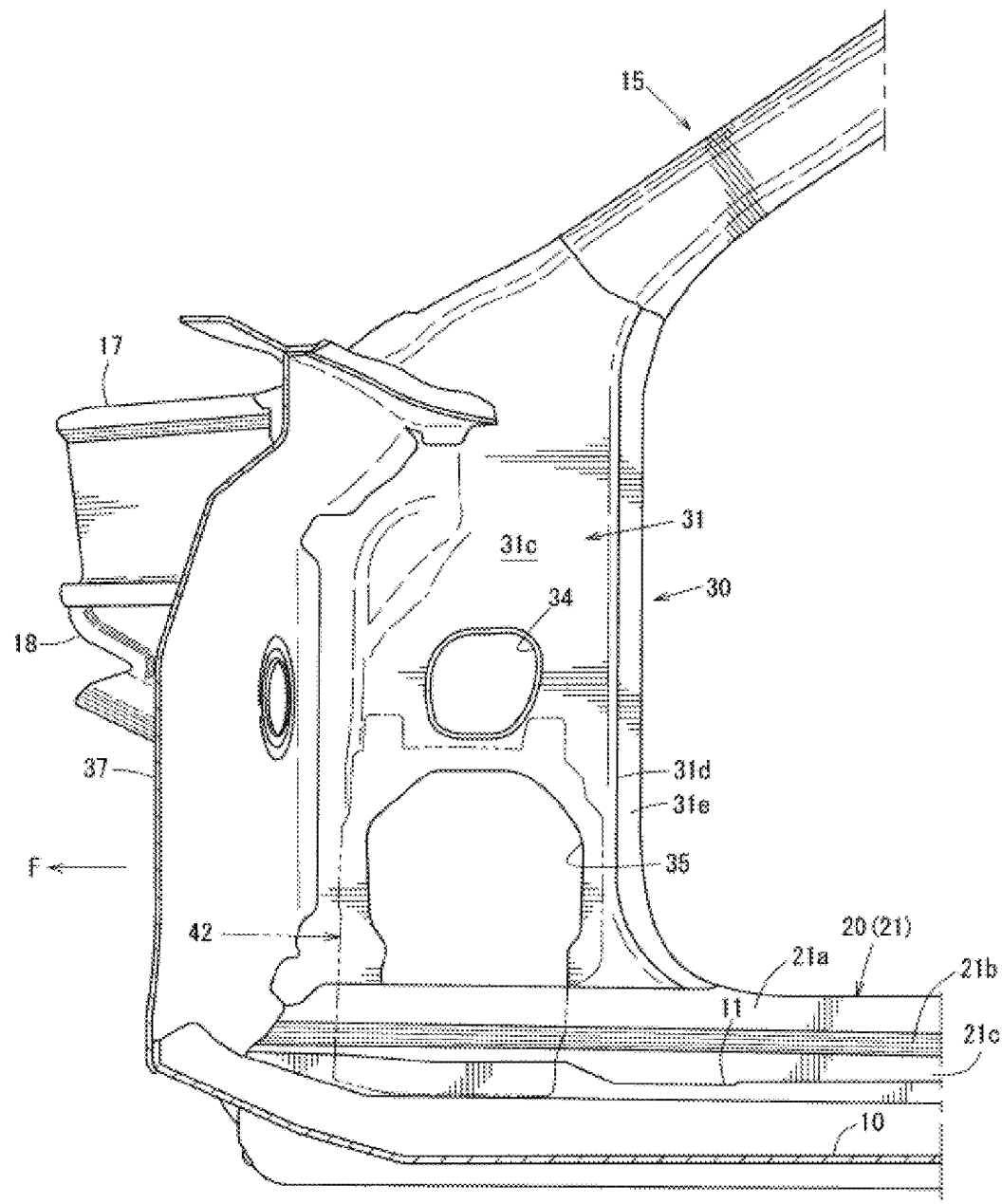
FIG. 2 is a side view showing a state in which a speaker box has been removed from FIG. 1.
Figure 3:
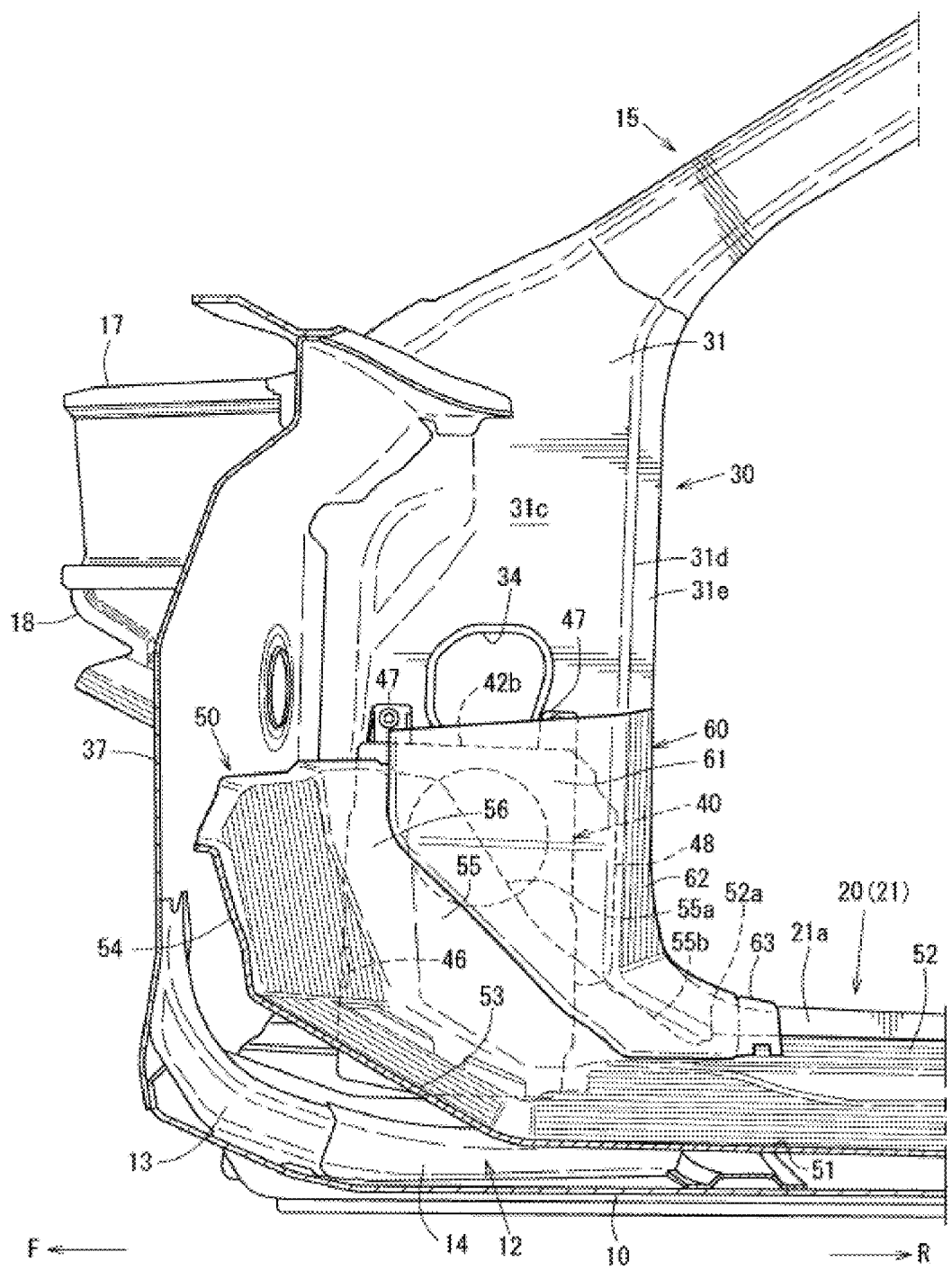
FIG. 3 is a side view showing a state in which a side trim and a floor mat are attached to the structure in FIG. 1.

The drawings show a speaker disposition structure of a vehicle, wherein FIG. 1 is a side view of the speaker disposition structure of the vehicle as viewed from the inside of a vehicle cabin, FIG. 2 is a side view showing a state in which a speaker box has been removed from FIG. 1, and FIG. 3 is a side view showing a state in which a side trim and a floor mat are attached to the structure in FIG. 1.

Figure 4:
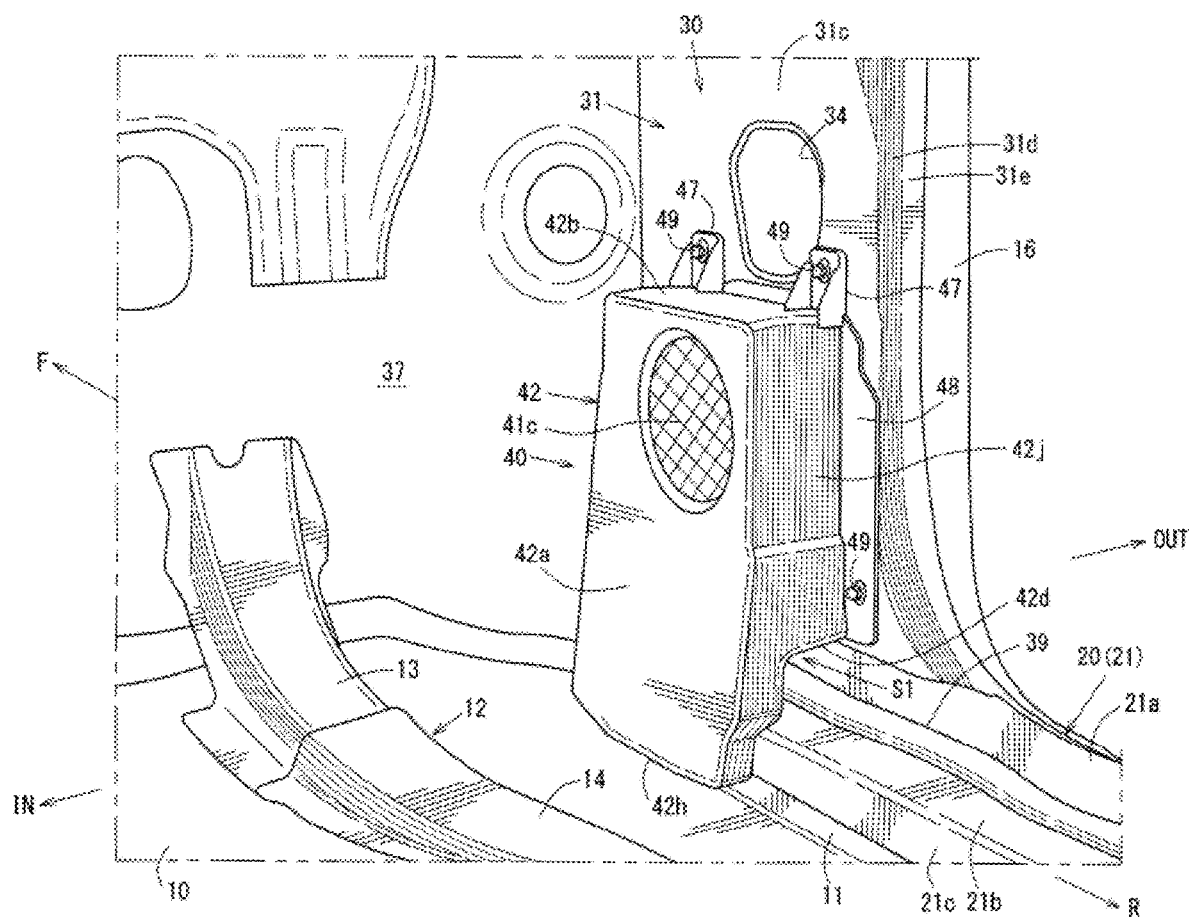
FIG. 4 is a perspective view of the speaker disposition structure of the vehicle as viewed from the inside and rear of the vehicle cabin.
Figure 5:
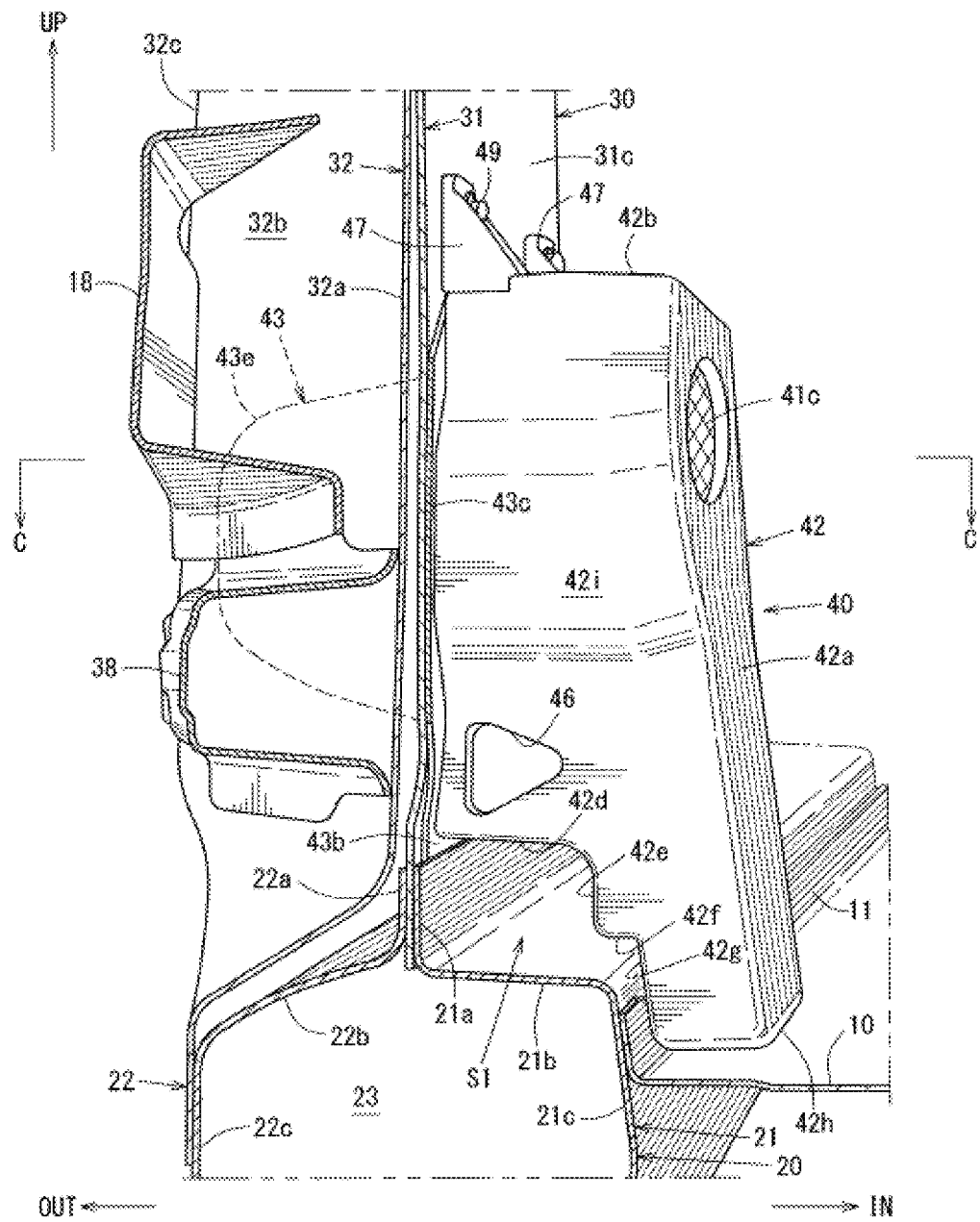
FIG. 5 is an arrow cross-sectional view taken along the A-A line in FIG. 1.
Figure 6:
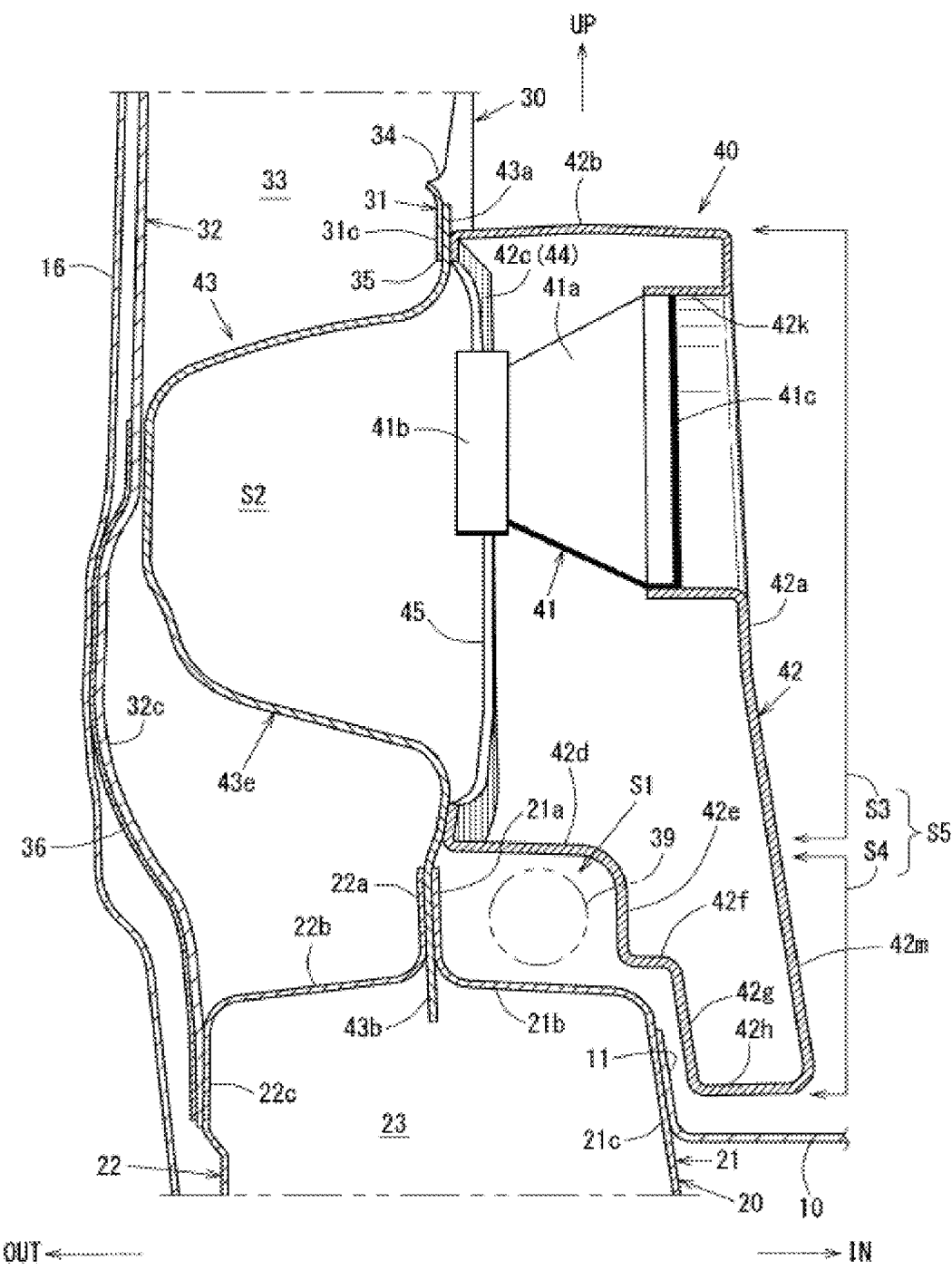
FIG. 6 is an arrow cross-sectional view of essential parts taken along the B-B line in FIG. 1.
Figure 7:
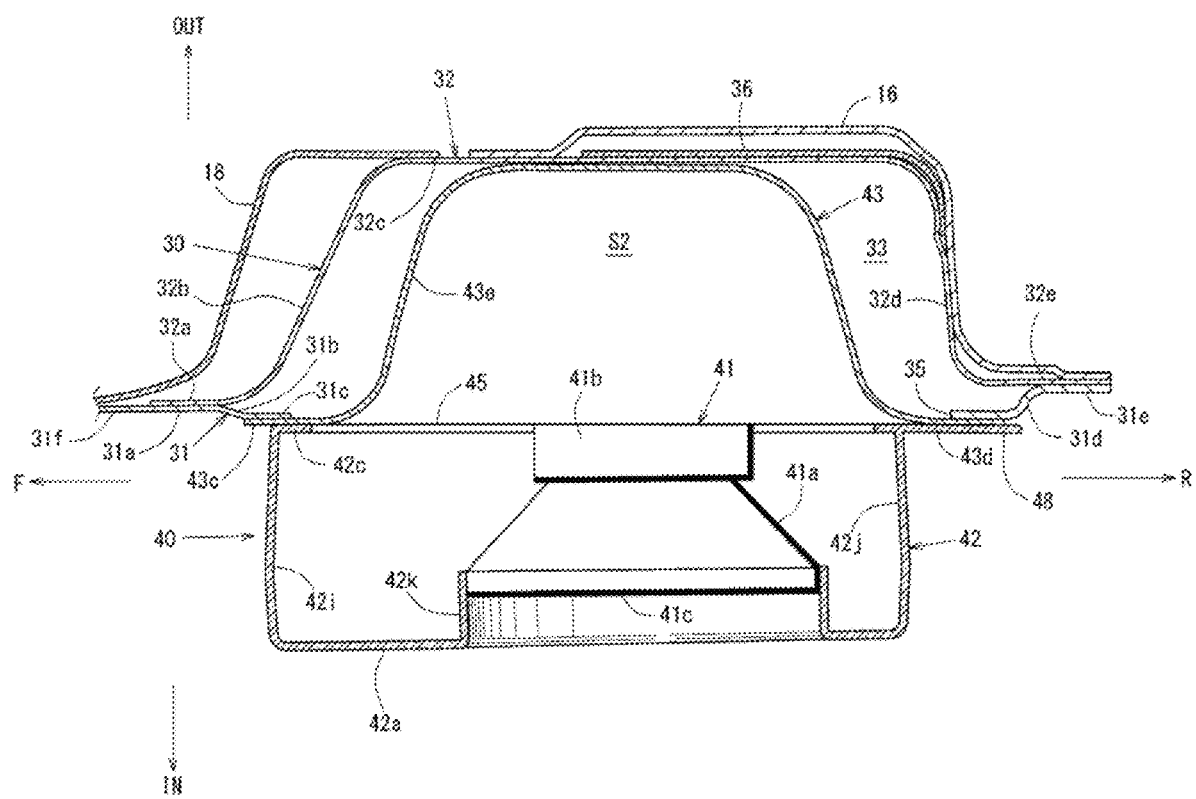
FIG. 7 is an arrow cross-sectional view taken along the C-C line in FIG. 5.

FIG. 4 is a perspective view of the speaker disposition structure of the vehicle as viewed from the inside and rear of the vehicle cabin, FIG. 5 is an arrow cross-sectional view taken along the A-A line in FIG. 1, FIG. 6 is an arrow cross-sectional view of essential parts taken along the B-B line in FIG. 1, and FIG. 7 is an arrow cross-sectional view taken along the C-C line in FIG. 5. In FIG. 1 and FIG. 2, a floor frame is omitted for convenience of illustration.

<Front Vehicle-Body Structure of Vehicle>

First, a front vehicle-body structure of the vehicle will be described before describing the speaker disposition structure.

As shown in FIG. 5 and FIG. 6, a floor panel 10 that forms a floor surface of the vehicle cabin is mounted, and a bent piece 11 rising upward is integrally formed on a vehicle-width-direction end of the floor panel 10.

A side sill 20 is joined and fixed to the bent piece 11 of the floor panel 10.

The side sill 20 is a vehicle body strengthening member that has a side sill closed cross-section 23 extending in the vehicle front-rear direction by joining and fixing a side sill inner 21 and a side sill outer 22 together.

As shown in FIG. 5 and FIG. 6, the side sill inner 21 includes an upper joined flange 21a, an upper wall 21b extending inward in the vehicle width direction from the lower end of the joined flange 21a, an inner wall 21c extending downward from the vehicle-width-direction inner end of the upper wall 21b, a lower wall extending outward in the vehicle width direction from the lower end of the inner wall 21c, and a lower joined flange extending downward from the vehicle-width-direction outer end of the lower wall.

As shown in FIG. 5 and FIG. 6, the side sill outer 22 includes an upper joined flange 22a, an upper wall 22b extending outward in the vehicle width direction from the lower end of the joined flange 22a, an outer wall 22c extending downward from the vehicle-width-direction outer end of the upper wall 22b, a lower wall extending inward in the vehicle width direction from the lower end of the inner wall 22c, and a lower joined flange extending downward from the vehicle-width-direction inner end of the lower wall.

The bent piece 11 of the floor panel 10 is joined and fixed to the inner wall 21c of the side sill inner 21.

Moreover, the upper joined flange 21a of the side sill inner 21 and the upper joined flange 22a of the side sill outer 22 are joined and fixed together. Similarly, the lower joined flange of the side sill inner 21 and the lower joined flange of the side sill outer 22 are joined and fixed together.

As shown in FIG. 4, a floor frame 12 having a hat-shaped cross section is connected to the top face of the floor panel 10. The floor frame 12 has a floor frame front portion 13 and a floor frame rear portion 14, and extends in the vehicle front-rear direction, and the floor frame front portion 13 is attached across a lower portion of a later-described dash panel 37 and a front portion of the floor panel 10.

A floor frame closed cross-section extending in the vehicle front-rear direction is formed between the floor frame rear portion 14 and the floor panel 10, thereby improving the lower vehicle body rigidity.

As shown in FIG. 1 and FIG. 2, provided is a hinge pillar 30 that extends in the vehicle up-down direction between the side sill 20 extending in the vehicle front-rear direction at a vehicle lower portion and a front pillar 15 extending in a diagonal direction at a vehicle upper portion, and that connects the side sill 20 and the front pillar 15.

Here, the front pillar 15 extends diagonally upward and rearward from the front end to the rear end, and the front pillar 15 is a vehicle body strengthening member that has a front pillar closed cross-section extending in the longitudinal direction of the front pillar 15 by joining and fixing a front pillar inner and a front pillar outer together.

As shown in FIG. 1 to FIG. 7, the hinge pillar 30 is a vehicle body strengthening member that has a hinge pillar closed cross-section 33 extending in the vehicle up-down direction by joining and fixing a hinge pillar inner 31 and a hinge pillar outer 32 together, the upper end of the hinge pillar 30 is fixed to the diagonal lower end of the front pillar 15, and the lower end of the hinge pillar 30 is fixed to the side sill 20.

As shown in FIG. 2 and FIG. 7, the hinge pillar inner 31 has a front joined flange 31a, a front-side step portion 31b, an inner wall 31c, a rear-side step portion 31d, a rear joined flange 31e, and also includes a front extending portion 31f extending further forward from the front joined flange 31a.

As shown in FIG. 7, the hinge pillar outer 32 is produced by integrally forming a front joined flange 32a, a front wall 32b, an outer wall 32c, a rear wall 32d, and a rear joined flange 32e to have a hat-shaped cross section in plan view.

The front wall 32b extends outward in the vehicle width direction from the rear end of the front joined flange 32a. The outer wall 32c extends from the vehicle-width-direction outer end of the front wall 32b toward the rear of the vehicle. The rear wall 32d extends inward in the vehicle width direction from the rear end of the outer wall 32c. Further, the rear joined flange 32e extends from the vehicle-width-direction inner end of the rear wall 32d toward the rear of the vehicle.

Furthermore, as shown in FIG. 7, the front joined flange 31a of the hinge pillar inner 31 and the front joined flange 32a of the hinge pillar outer 32 are joined and fixed together, and the rear joined flange 31e of the hinge pillar inner 31 and the rear joined flange 32e of the hinge pillar outer 32 are joined and fixed together to form the hinge pillar 30.

As shown in FIG. 2, an opening 34 is formed at a middle portion in the up-down direction of the inner wall 31c of the hinger pillar inner 31, and an opening 35 for attaching an outer-side box part 43 of a later-described speaker box 40 is formed at a lower portion of the inner wall 31c below the opening 34.

As shown in FIG. 4, FIG. 6 and FIG. 7, vehicle-exterior-side faces of the side sill 20, the front pillar 15 and the hinge pillar 30 are integrally covered with a cab side outer panel 16.

As shown in FIG. 7, on the hinge pillar outer 32 of the hinge pillar 30, a hinge reinforcement 36 is joined and fixed at a portion at which a body-side hinge bracket of a door hinge is attached.

Although only the structure on the right side of the vehicle is shown in the drawings, the side sill 20, the front pillar 15 and the hinge pillar 30 are formed on the right side and left side in a substantially symmetrical structure, and the dash panel 37 connecting front portions of a pair of left and right hinger pillars 30, 30 to each other in the vehicle width direction is mounted as shown in FIG. 1 and FIG. 2.

FIG. 1 to FIG. 3 show an apron reinforcement 17. FIG. 1 to FIG. 3, FIG. 5 and FIG. 7 show a connection reinforcement 18 that diagonally connects the apron reinforcement 17 and the hinge pillar 30, FIG. 5 shows a gusset 38 as a high-rigidity member that extends in the front-rear direction and connects a wheel arch for a front wheel and the hinge pillar 30.

<Configuration of Speaker Box>

Next, the configuration of the speaker box will be described in detail.

Figure 8:
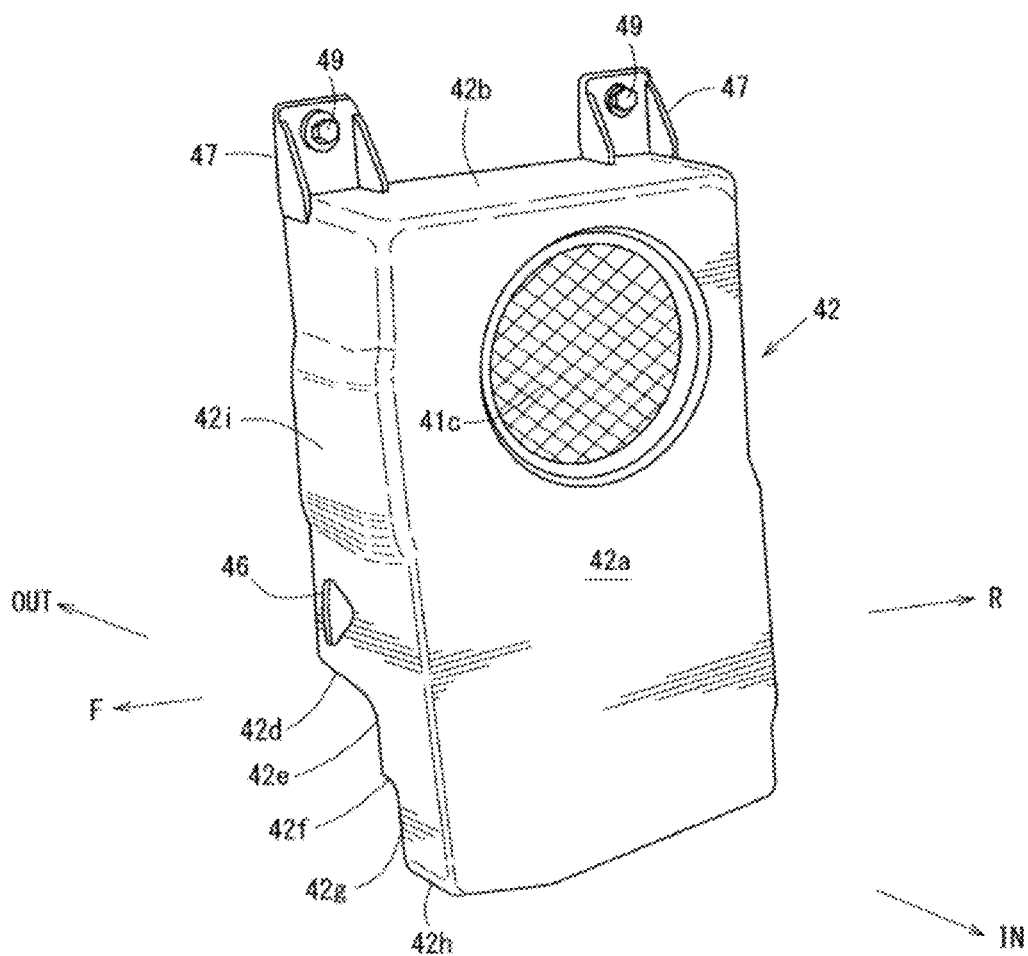
FIG. 8 is a perspective view showing an inner-side box part of the speaker box.

FIG. 8 is a perspective view showing an inner-side box part, FIG. 9A is a perspective view of the outer-side box part as viewed from the front and the vehicle-width-direction outer side of the vehicle, and FIG. 9B is a perspective view of the outer-side box part as viewed from the front and the vehicle-width-direction inner side of the vehicle.

As shown in FIG. 1 and FIG. 4, the bass reflex type speaker box 40 is fixed in the vicinity of the side sill 20 at the lower portion of the hinge pillar 30.

As shown in FIG. 6 and FIG. 7, this speaker box 40 includes an inner-side box part 42 formed of a resin member that holds a speaker 41, and an outer-side box part 43 formed of a sheet metal, located on the vehicle-width direction outer side relative to the inner-side box part 42.

As shown in FIG. 6 and FIG. 7, the speaker 41 includes: a frame 41a having a damper, a cone, etc. therein; a yoke 41b located at a neck portion of the frame 41a; and a speaker grill 41c attached to the open side of the cone.

Meanwhile, as shown in FIG. 6, a gap portion S1 in which a wire harness 39 as a vehicle component is to be placed is formed at a vehicle-interior-side upper part of the side sill 20, more specifically, above the upper wall 21b of the side sill inner 21.

As shown in FIG. 6, FIG. 7 and FIG. 9, the outer-side box part 43 includes an upper-side flange 43a, a lower-side flange 43b, a front-side flange 43c, a rear-side flange 43d, and a bulge 43e bulging out from the respective flanges to the vicinity of the outer wall 32c of the hinge pillar outer 32.

The bulge 43e is formed in a dorm shape, and a hollow portion S2 is formed inside the bulge 43e.

The upper-side flange 43a, the front-side flange 43c and the rear-side flange 43d among the respective flanges 43a, 43b, 43c, 43d are fixed to a vehicle-width-direction inner-side face of the inner wall 31c of the hinge pillar inner 31, at the edge of the opening 35 shown in FIG. 2, by joining means such as spot welding (see FIG. 6 and FIG. 7).

As shown in FIG. 6, the lower-side flange 43b of the outer-side box part 43 is fixed to the side sill 20 that is a vehicle-body framework member. More specifically, the lower-side flange 43b is interposed and fixed between the upper joined flange 21a of the side sill inner 21 and the upper joined flange 22a of the side sill outer 22. Moreover, these parts 21a, 43b, 22a are joined and fixed together by attaching these parts in an overlapped manner and welding the parts together (so-called three-piece overlap welding).

As shown in FIG. 1, FIG. 4 to FIG. 8, particularly in FIG. 6, the inner-side box part 42 includes a front face wall 42a, an upper wall 42b, a rear face wall 42c, an upper transverse wall 42d, an upper vertical wall 42e, a lower transverse wall 42*f*, a lower vertical wall 42*g*, a lower wall 42*h*, and a front wall 42*i* and a rear wall 42*j* shown in FIG. 7.

As shown in FIG. 6, the front face wall 42*a* forms a front face on the vehicle-width-direction inner side of the speaker box 40. A cylindrical speaker support 42*k* extending toward the inside of a space portion inside the inner-side box part 42, that is, toward the vehicle-width-direction outer side, is integrally formed at an upper portion of the front face wall 42*a*, and the speaker 41 is supported by this support 42*k*.

The upper wall 42*b* extends outward in the vehicle width direction from the upper end of the front face wall 42*a*. The rear face wall 42*c* extends downward from the vehicle-width-direction outer end of the upper wall 42*b*.

The rear face wall 42*c* as a whole forms an abutting part 44 that abuts the hinge pillar inner 31 through the flanges 43*a* to 43*d* of the outer-side box part 43. Further, formed in the rear face wall 42*c* is a communication opening 45 that connects the hollow portion S2 on the outer-side box part 43 side to an upper space portion S3 on the inner-side box part 42 side.

Here, the upper space portion S3 is a space portion that bulges inward in the vehicle width direction from the abutting part 44 above the gap portion S1, and holds the speaker 41 through the speaker support 42*k*.

The gap portion S1 is a gap surrounded by the upper joined flange 21*a* and the upper wall 21*b* of the side sill inner 21 and the upper transverse wall 42*d* and upper vertical wall 42*e* of the inner-side box part 42, and extending in the vehicle front-rear direction.

As shown in FIG. 6, the upper transverse wall 42*d* extends inward in the vehicle width direction from the lower end of the rear face wall 42*c*. Moreover, the upper vertical wall 42*e* extends downward from the vehicle-width-direction inner end of the upper transverse wall 42*d*. Further, the lower transverse wall 42*f* extends inward in the vehicle width direction from the lower end of the upper vertical wall 42*e*. Furthermore, the lower vertical wall 42*g* extends downward from the vehicle-width-direction inner end of the lower transverse wall 42*f*. Additionally, the lower wall 42*h* extends inward in the vehicle width direction from the lower end of the lower vertical wall 42*g*, and connects the lower end of the lower vertical wall 42*g* to front face wall 42*a*.

As shown in FIG. 7 and FIG. 8, the front wall 42*i* closes the front of the inner-side box part 42 surrounded by the parts 42*a* to 42*h*. As shown in FIG. 4 and FIG. 7, the rear wall 42*j* closes the rear of the inner-side box part 42 surrounded by the parts 42*a* to 42*h*.

As shown in FIG. 5 and FIG. 8, since the speaker box 40 of this example is a bass reflex type enclosure, a port opening 46 that connects with the inner space of the speaker box 40 is formed to open in a lower part of the front wall 42*i* of the inner-side box part 42 (the front face of the speaker box 40). The inner space of the speaker box 40 includes the hollow portion S2, the upper space portion S3, and a later-described extended space portion S4.

As shown in FIG. 4, a pair of front and rear mounting seats 47, 47 are integrally formed at a top portion of the inner-side box part 42, and a flange 48 that protrudes toward the rear of the vehicle and extends in the up-down direction is integrally formed at a rear portion of the inner-side box part 42, on the upper side of the upper transverse wall 42*d*. Moreover, the mounting seats 47 and the flange 48 are fastened and fixed to the hinge pillar inner 31 using fastening members 49 such as bolts and nuts.

As shown in FIG. 6, on the lower side of the inner-side box part 42 relative to the upper transverse wall 42*d*, the extended space portion S4 that extends downward from the upper space portion S3 and is adjacent to the vehicle-width-direction inner side of the gap portion S1 is formed.

This extended space portion S4 is a space portion surrounded by the upper vertical wall 42*e*, the lower transverse wall 42*f*, the lower vertical wall 42*g*, the lower wall 42*h*, and the lower portions of the front face wall 42*a*, the front wall 42*i* and the rear wall 42*j* corresponding to these parts 42*e* to 42*h*.

As shown in FIG. 6, a closed space S5 that connects the upper space portion S3 to the extended space portion S4 in the up-down direction is formed.

Moreover, as shown in FIG. 6, the extended space portion S4 is formed such that the vehicle-width-direction dimension in a cross section orthogonal to the vehicle front-rear direction (namely, a vehicle-width-direction cross section) is smaller in the lower portion than in the upper portion. In other words, the extended space portion S4 is formed such that, in the cross section orthogonal to the vehicle front-rear direction, the vehicle-width-direction dimension becomes smaller towards the bottom.

For the structure in which the vehicle-width-direction dimension is smaller in the lower portion than in the upper portion, the vehicle-width-direction dimension may become smaller stepwise or may become smaller continuously, and this embodiment adopts a structure in which the vehicle-width-direction dimension becomes smaller stepwise as shown in FIG. 6.

The extended space portion S4 is provided so as to secure the capacity of the speaker box 40 without cramping the cabin (driver room), and to secure a layout of the wire harness 39 as a vehicle component by the gap portion S1. Further, by forming the extended space portion S4 such the vehicle-width-direction dimension is smaller in the lower portion than in the upper portion, an increase in air flow resistance in the speaker box 40 during reproducing sound from the speaker 41 is prevented so as to reproduce expected bass.

As shown in FIG. 6, the extended space portion S4 has an inner wall 42*m* located on the vehicle-width-direction inner side (see the lower portion of the front face wall 42*a* corresponding to the region of the extended space portion S4), and an outer wall located on the vehicle-width-direction outer side (see each part of the upper vertical wall 42*e*, the lower transverse wall 42*f*, and the lower vertical wall 42*g*).

As shown in FIG. 6, the inner wall 42*m* is arranged to be inclined inward of the vehicle cabin (that is, inward in the vehicle width direction), towards the bottom. Thus, this configuration secures the capacity of the speaker box 40 as the inner wall 42*m* is inclined inward of the vehicle cabin, towards the bottom.

Furthermore, as shown in FIG. 6, in the outer wall (the upper vertical wall 42*e*, the lower transverse wall 42*f*, the lower vertical wall 42*g*) of the extended space portion S4, a step-down portion (the lower transverse wall 42*f*) that is stepped down toward the inside of the vehicle cabin is provided at the lower portion of the gap portion S1. Thus, this configuration provides the extended space portion S4 while avoiding interference with the side sill 20 (more specifically, the side sill inner 21) located immediately below the gap portion S1, and secures the capacity of the speaker box 40 by the extended space portion S4.

<Speaker Disposition Structure of Vehicle>

Next, the speaker disposition structure of the vehicle will be described in detail with reference to FIG. 3, FIG. 10 to FIG. 14.

Figure 10:
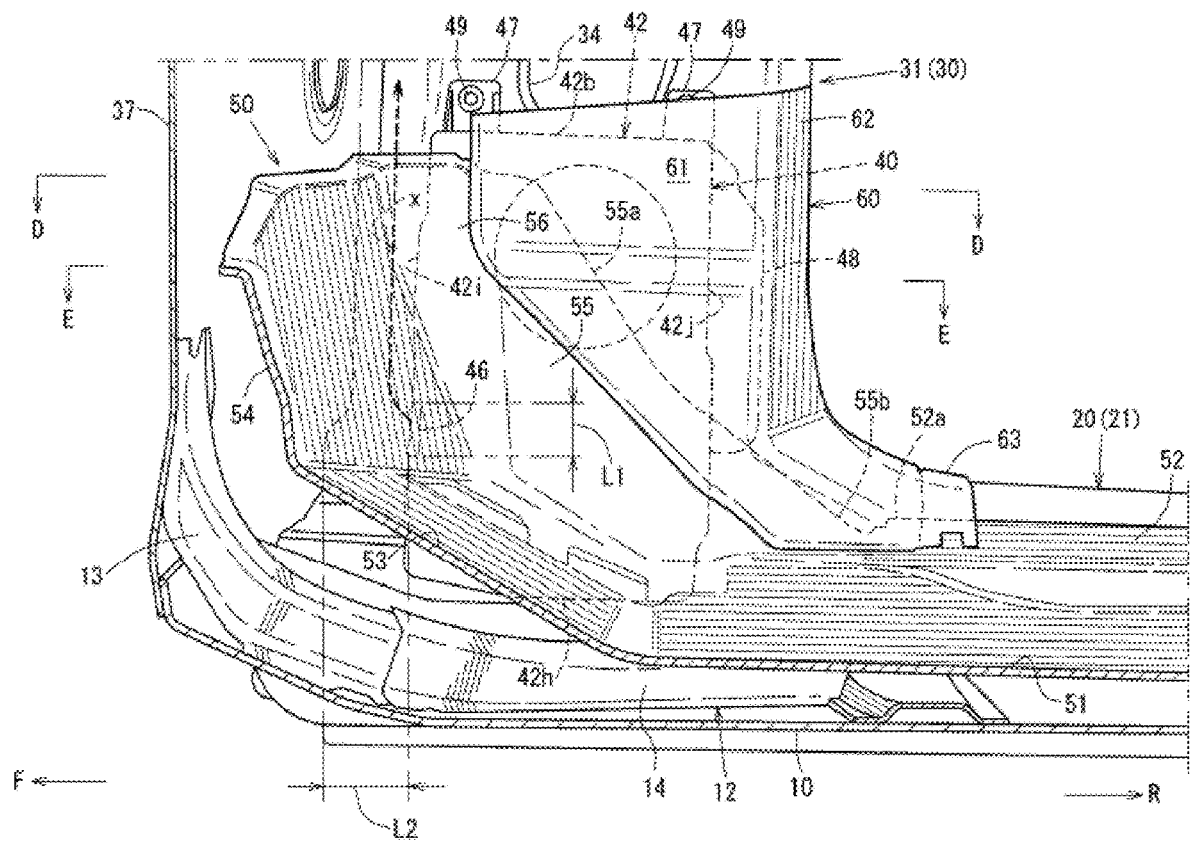
FIG. 10 is an enlarged side view of the essential parts in FIG. 3.
Figure 11:
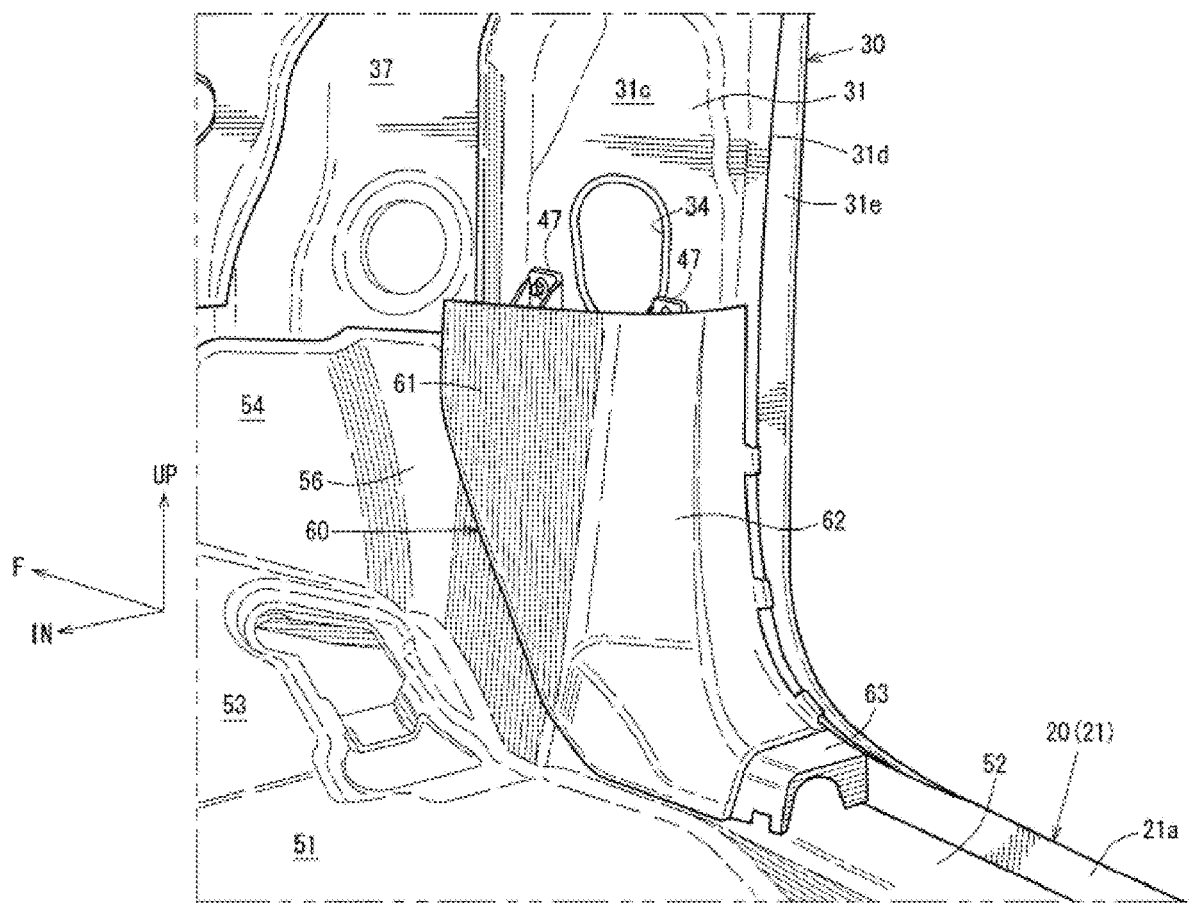
FIG. 11 is a perspective view of the structure in FIG. 10 as viewed from the inside and rear of the vehicle cabin.

FIG. 10 is an enlarged side view of the essential parts in FIG. 3, FIG. 11 is a perspective view of the structure in FIG.

Figure 12:
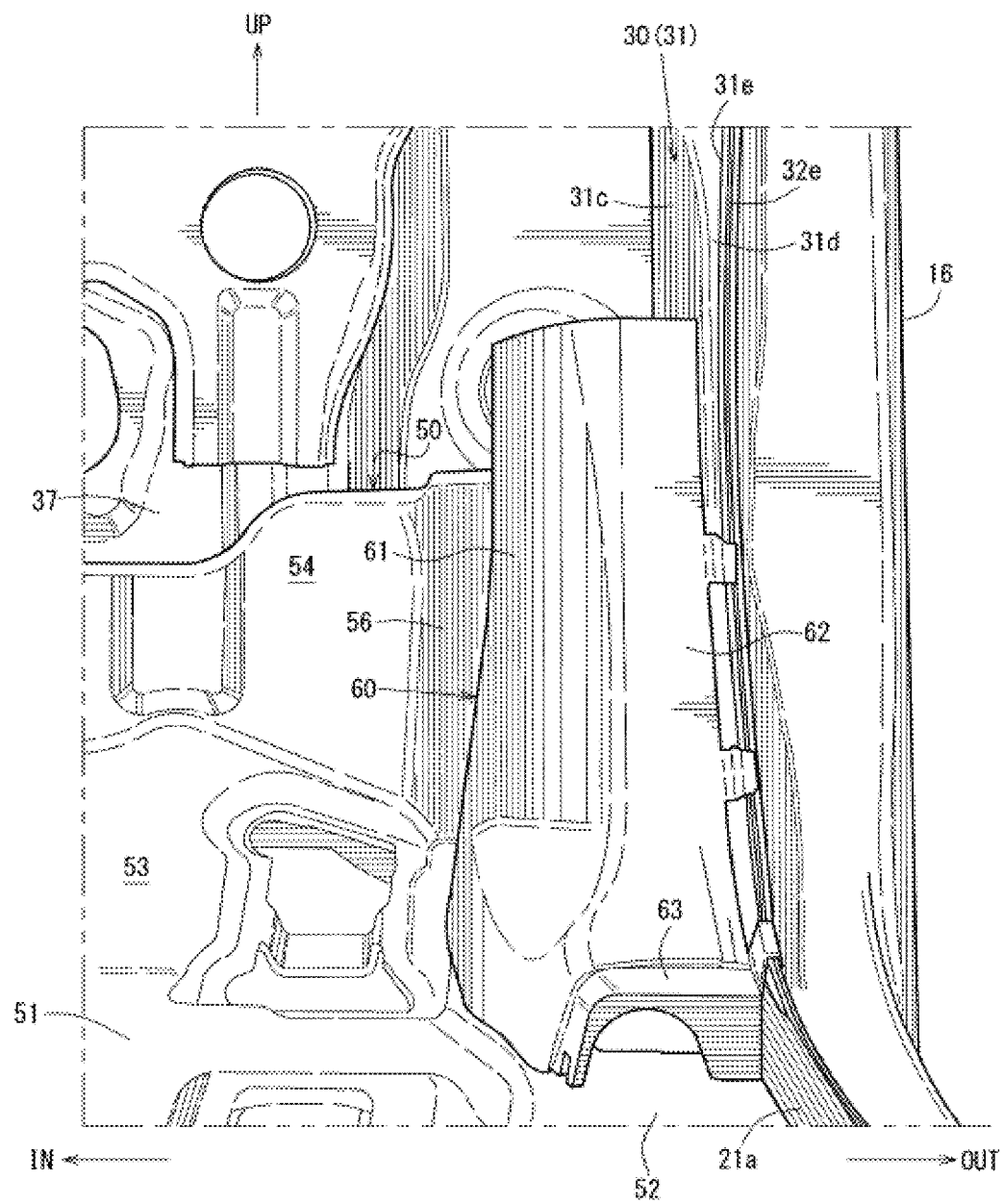
FIG. 12 is a back view of the essential parts in FIG. 10.
Figure 13:
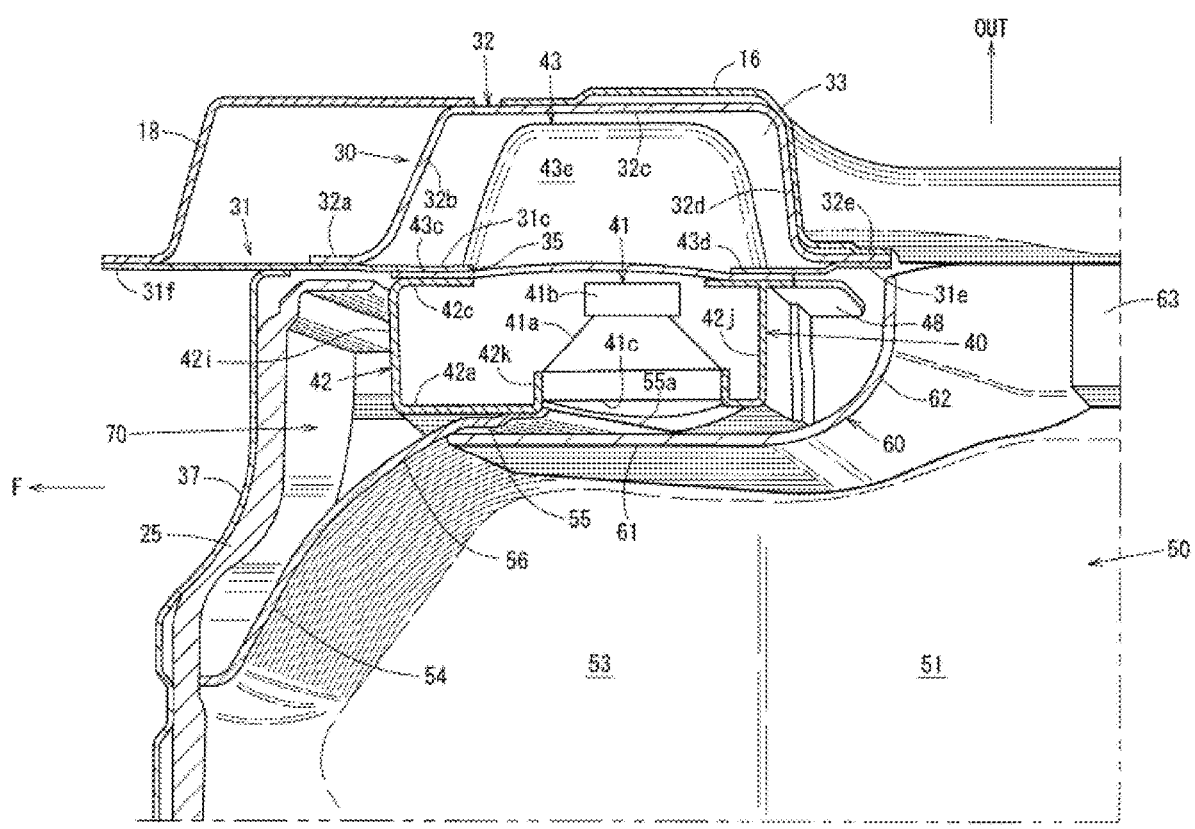
FIG. 13 is an arrow cross-sectional view taken along the D-D line in FIG. 10.
Figure 14:
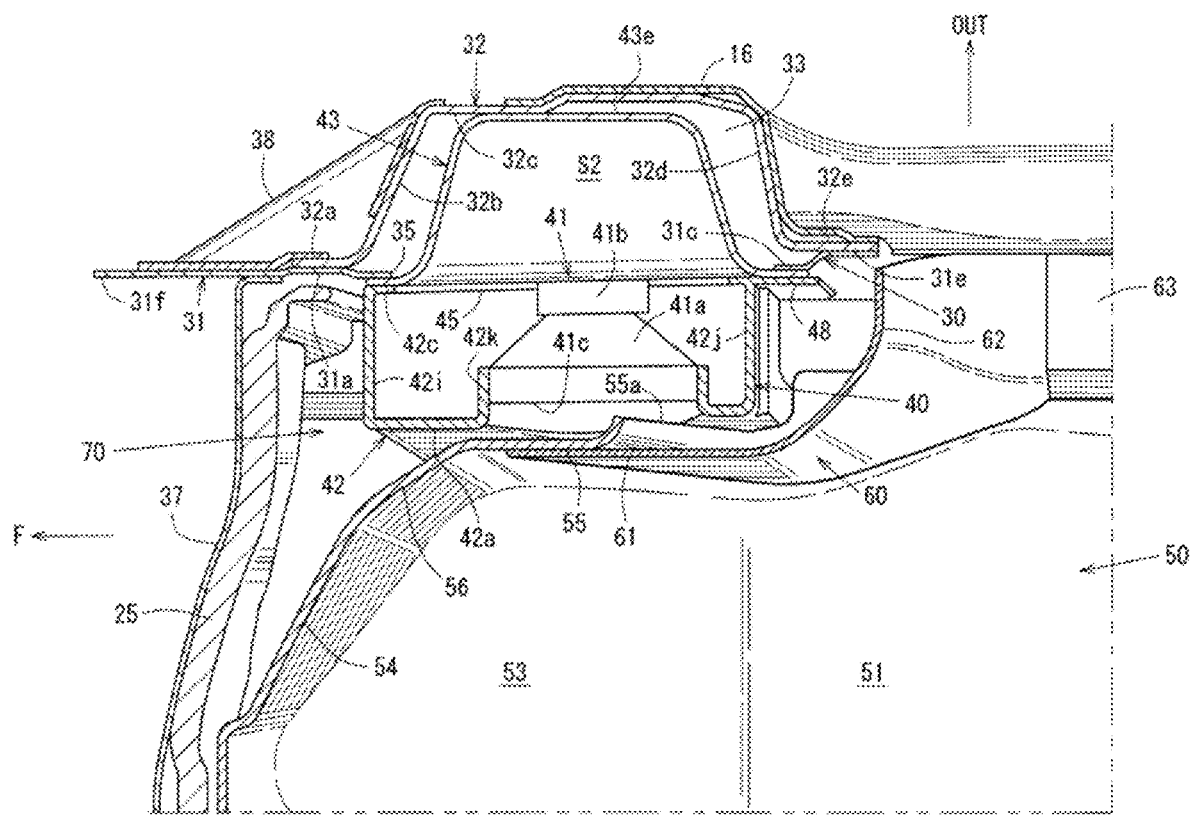
FIG. 14 is an arrow cross-sectional view taken along the E-E line in FIG. 10.

10 as viewed from the inside and rear of the vehicle cabin, FIG. 12 is a back view of the essential parts in FIG. 10, FIG. 13 is an arrow cross-sectional view taken along the D-D line in FIG. 10, and FIG. 14 is an arrow cross-sectional view taken along the E-E line in FIG. 10.

As shown in FIG. 10 to FIG. 14, a floor mat 50 is provided as a partition member located on the vehicle-width-direction inner side of the inner-side box part 42 of the speaker box 40.

As shown in FIG. 10 to FIG. 14, the floor mat 50 includes a substantially horizontal main face 51 covering the top of the floor panel 10, a side piece 52 covering the side sill inner 21 at a vehicle-width-direction side portion of the main face 51, and a front inclined portion 53 extending from the front of the main face 51 forward and upward of the vehicle in an inclined manner.

Moreover, the floor mat 50 includes a front extending portion 54 extending upward from the front end of the front inclined portion 53, a side extending portion 55 extending upward from a vehicle-width-direction end of the front inclined portion 53, and a connecting portion 56 that connects a vehicle-width-direction end of the front extending portion 54 and the front end of the side extending portion 55.

Among the main face 51, the side piece 52, the front inclined portion 53, the front extending portion 54, the side extending portion 55 and the connecting portion 56 that form the floor mat 50, the front extending portion 54, the side extending portion 55 and the connecting portion 56 extend in the vehicle up-down direction on the vehicle-width-direction inner side of the inner-side box part 42.

As shown by the dotted line in FIG. 10, a rear-side end 55a of the side extending portion 55 extends diagonally rearward from the upper front side to the lower rear side, and an inclined lower end 55b of the rear-side end 55a is connected to a front end 52a of the side piece 52.

As shown in FIG. 13 and FIG. 14, a side trim 60 that covers the speaker box 40 and the hinge pillar inner 31 from the inside of the vehicle cabin is mounted.

As shown in FIG. 13 and FIG. 14, the side trim 60 is formed to cover, from the inside of the vehicle cabin, a range from the vehicle-width-direction inner side of the front face wall 42a of the inner-side box part 42 of the speaker box 40 to the vicinity of the rear end of the rear joined flange 31e of the hinge pillar inner 31.

As shown in FIG. 13 and FIG. 14, the side trim 60 includes a side wall 61 that covers the front face wall 42a of the inner-side box part 42, and a rear wall 62 that is connected to the side wall 61 and covers the rear wall 42j of the inner-side box part 42, the flange 48, and the vicinity of the rear end of the joined flange 31e of the hinge pillar inner 31.

Moreover, provided in rear of a lower part of the side trim 60 is a lower wall 63 that is formed integrally with the side wall 61 and the rear wall 62, and covers the front portion of the side piece 52 of the floor mat 50 from above.

As shown in FIG. 10, the side wall 61 of the side trim 60 is located on the vehicle-width-direction inner side of the side extending portion 55 of the floor mat 50 such that the front end and the lower end of the side wall 61 of the side trim 60 overlap the side extending portion 55 of the floor mat 50.

As shown in FIG. 13 and FIG. 14, an insulator 25 is mounted on the vehicle-interior-side face of the dash panel 37.

An engine (not shown) is mounted in an engine room formed in front of the dash panel 37, and the insulator 25 prevents heat damage to an exhaust system of the engine. In the drawings other than FIG. 13 and FIG. 14, the insulator 25 is omitted for convenience of illustration.

As shown in FIG. 13 and FIG. 14, a space portion 70 surrounded by the front face of the speaker box 40, the dash panel 37, the hinge pillar 30, and the floor mat 50 as the partition member is formed.

More specifically, the space portion 70 is surrounded by the front wall 42i of the inner-side box part 42, the insulator 25 on the back face of the dash panel 37, the hinge pillar inner 31, and the front extending portion 54, the side extending portion 55 and the connecting portion 56 of the floor mat 50.

As shown in FIG. 10, the front extending portion 54, the side extending portion 55 and the connecting portion 56 of the floor mat 50 are placed from above the floor panel 10 to the vehicle-width-direction inner side in the vicinity of the upper end of the speaker box 40, and these portions 54, 55, 56 are not present in a section above the location of the vicinity of the upper end of the speaker box 40. Thus, the space portion 70 is formed to connect with the occupant space, on the upper side of the space portion 70.

As shown in FIG. 10, a front-rear-direction dimension L2 of the space portion 70, from the port opening 46 (more specifically, the front-rear-direction dimension between the port opening 46 and the insulator 25) is set at least greater than a maximum dimension L1 of the port opening 46.

More specifically, the longer the front-rear-direction dimension L2 of the space portion 70, the higher the effect of preventing so-called wind noise, and preferably, when the maximum dimension L1 of the port opening 46 is, for example, 40 mm, the front-rear-direction dimension L2 of the space portion 70 is set, for example, to 100 mm. That is, the space portion 70 is configured to satisfy a relational expression of L2>L1.

Thus, the port opening 46 is formed in the front wall 42i of the inner-side box part 42 of the speaker box 40, and since this port opening 46 is not closed by the floor mat 50, blocking of a reproduced sound from the port by the floor mat 50 is prevented.

Moreover, the space portion 70 connects with the occupant space, and is configured to transmit the reproduced sound from the port opening 46 to the cabin. That is, as shown by an arrow x in FIG. 10, the reproduced sound from the port opening 46 is transmitted through the space portion 70 to the cabin from the upper side of the space portion 70.

Further, the space portion 70 is constituted by the floor mat 50 as the partition member, thereby preventing mud and water from splashing on the port opening 46 even when the speaker box 40 is arranged in the occupant foot space.

Furthermore, the front-rear-direction dimension L2 of the space portion 70, from the port opening 46, is at least greater than the maximum dimension L1 of the port opening 46. This prevents occurrence of wind noise due to movement of air flowing from the port opening 46.

In addition, since the partition member is formed by the floor mat 50, the partition member is formed by effectively utilizing an existing vehicle component (floor mat 50), without separately providing another member.

Moreover, as shown in FIG. 10, the space portion 70 is formed to extend from the lower side of the speaker box 40 to the vicinity of the upper end location of the speaker box 40. Thus, even when the port opening 46 is formed at any height position in the up-down direction in the front wall 42i of the inner-side box part 42 of the speaker box 40, it is possible to transmit the reproduced sound from the port to the cabin, and improve the degree of freedom in setting the height position of the port opening 46.

Further, as shown in FIG. 13 and FIG. 14, the partition member that forms the space portion 70, namely the side extending portion 55, the connecting portion 56, and the front extending portion 54 of the floor mat 50, particularly the connecting portion 56 and the front extending portion 54 are disposed in front of the port opening 46 so as to incline inward in the vehicle width direction, towards the front of the vehicle in a vehicle plan view. This configuration increases the capacity of the space portion 70 without interfering with the occupant foot space, and reliably prevents occurrence of wind noise due to movement of air flowing from the port opening 46.

In the drawings, an arrow F indicates the direction toward the front of the vehicle, an arrow R indicates the direction toward the rear of the vehicle, an arrow IN indicates the direction toward the inner side in the vehicle width direction, an arrow OUT indicates the direction toward the outer side in the vehicle width direction, and an arrow UP indicates the direction toward the upper side of the vehicle.

Thus, the speaker disposition structure of the vehicle of the embodiment includes: a pair of left and right hinge pillars 30 extending in the vehicle up-down direction; the dash panel 37 connecting the front portions of the pair of left and right hinge pillars 30 to each other in the vehicle width direction; the speaker box 40 that holds the speaker 41, is fixed to the lower portion of the hinge pillar 30, and has the closed inner space; and the partition member (see the floor mat 50) located on the vehicle-width-direction inner side of the speaker box 40, wherein the port opening 46 connecting with the inner space (see the hollow portion S2, the upper space portion S3, and the extended space portion S4) of the speaker box 40 is formed in the front face of the speaker box 40 (the front wall 42$i$ of the inner-side box part 42), the space portion 70 surrounded by the front face of the speaker box 40, the dash panel 37, the hinge pillar 30, and the partition member (the floor mat 50) is formed, the space portion 70 is arranged to connect with an occupant space, on the upper or lower side (in this embodiment, the upper side) thereof, and the front-rear-direction dimension L2 of the space portion 70, from the port opening 46, is set at least greater than the maximum dimension L1 of the port opening 46 (see FIG. 10, FIG. 13, and FIG. 14).

According to this configuration, since the port opening 46 is formed in the front face of the speaker box 40 (the front wall 42$i$ of the inner-side box part 42), the port opening 46 is not closed by the partition member (the floor mat 50), thereby preventing a reproduced sound from the port from being blocked by the partition member (the floor mat 50).

Moreover, since the space portion 70 connects with the occupant space, the reproduced sound from the port opening 46 can be transmitted to the cabin.

Further, since the space portion 70 is constituted by the partition member (the floor mat 50), it is possible to prevent mud and water from splashing on the port opening 46.

Furthermore, since the front-rear-direction dimension L2 of the space portion 70, from the port opening 46, is at least greater than the maximum dimension L1 of the port opening 46, it is possible to prevent occurrence of wind noise due to movement of air flowing from the port opening 46.

Moreover, in one embodiment of the present disclosure, the partition member is formed by the floor mat 50 placed from above the floor panel 10 to the vehicle-width-direction inner side of the speaker box 40 (see FIG. 10, FIG. 13 and FIG. 14).

According to this configuration, it is possible to form the partition member by effectively utilizing an existing vehicle component (the floor mat 50), without separately providing another member.

Further, in one embodiment of the present disclosure, the space portion 70 is formed from the lower side of the speaker box 40 to the vicinity of the upper end location of the speaker box 40 (see FIG. 10).

According to this configuration, even when the port opening 46 is formed at any height position in the up-down direction in the front face of the speaker box 40 (the front wall 42$i$ of the inner-side box part 42), the reproduced sound from the port can be transmitted to the cabin.

Furthermore, in one embodiment of the present disclosure, the partition member (see the floor mat 50, particularly the front extending portion 54 and the connecting portion 56) that forms the space portion 70 is disposed such that, in front of the port opening 46, the partition member is inclined inward in the vehicle width direction, towards the front of the vehicle in plan view (see FIG. 13 and FIG. 14).

According to this configuration, since it is possible to secure the capacity of the space portion 70, occurrence of wind noise due to movement of air flowing from the port opening 46 can be reliably prevented.

For correspondence between the configuration of the present disclosure and the above-described embodiment, the speaker box of the present disclosure corresponds to the bass reflex type speaker box 40 of the embodiment, and similarly the partition member corresponds to the floor mat 50, the inner space of the speaker box corresponds to the hollow portion S2, the upper space portion S3 and the extended space portion S4, and the front face of the speaker box corresponds to the front wall 42$i$ of the inner-side box part 42, but the present disclosure is not necessarily limited to only the configuration of the embodiment.

For example, the above embodiment presents the configuration in which the space portion 70 connects with the occupant space, on the upper side of the space portion 70, but the space portion 70 may adopt a structure in which the space portion 70 connects with the occupant space, on the lower side of the space portion 70.

Further, in the embodiment, although the port opening 46 of the bass reflex type speaker box 40 is formed in a triangular shape as shown in FIG. 5, the port opening 46 may have other shape, such as a circular shape and a quadrangular shape, instead of the triangular shape.

As described above, the present disclosure is useful for a speaker disposition structure of a vehicle, including: a pair of left and right hinge pillars extending in the vehicle up-down direction; a dash panel connecting front portions of the pair of left and right hinge pillars to each other in the vehicle width direction; a speaker box that holds a speaker, is fixed to a lower portion of the hinge pillar, and has a closed inner space; and a partition member located on the vehicle-width-direction inner side of the speaker box.

REFERENCE SIGNS LIST

10 Floor panel
30 Hinge pillar
37 Dash panel
40 Speaker box
41 Speaker
42$i$ Front wall
46 Port opening
50 Floor mat
70 Space portion S2 Hollow portion
S3 Upper space portion
S4 Extended space portion

The invention claimed is:

1. A speaker disposition structure of a vehicle, the speaker disposition structure comprising:
   a left hinge pillar and a right hinge pillar, both extending in a vehicle up-down direction, the left hinge pillar including a left dash panel connecting front portion and the right hinge pillar including a right dash panel connecting front portion, the left dash panel connecting front portion and the right dash panel connecting front portion connecting to each other in a vehicle width direction;
   a speaker box that holds a speaker, the speaker box being fixed to a lower portion of one of the left and right hinge pillars, and the speaker box having a closed inner space; and
   a partition located on a vehicle width direction inner side of the speaker box, wherein
   the partition is formed by a floor mat placed from above a floor panel to the vehicle width direction inner side of the speaker box,
   a port opening connects with the inner space of the speaker box and is located in a front face of the speaker box,
   the speaker disposition structure further includes a space portion that is surrounded by the front face of the speaker box, the dash panel, the hinge pillar, and the partition,
   the space portion connects with an occupant space on an upper or lower side of the space portion, and
   a length of the space portion, from the port opening in a front-rear direction of the vehicle, is greater than a maximum length of the port opening.

2. The speaker disposition structure according to claim 1, wherein the space portion is formed from a lower side of the speaker box to a vicinity of an upper end location of the speaker box.

3. The speaker disposition structure according to claim 2, wherein the partition is disposed such that, in front of the port opening, the partition is inclined inward in the vehicle width direction towards a front of the vehicle in a plan view.

4. The speaker disposition structure according to claim 1, wherein the space portion is formed from a lower side of the speaker box to a vicinity of an upper end location of the speaker box.

5. The speaker disposition structure according to claim 1, wherein the partition is disposed such that, in front of the port opening, the partition is inclined inward in the vehicle width direction towards a front of the vehicle in a plan view.

6. The speaker disposition structure according to claim 4, wherein the partition is disposed such that, in front of the port opening, the partition is inclined inward in the vehicle width direction towards a front of the vehicle in a plan view.

7. The speaker disposition structure according to claim 1, wherein the space portion is surrounded by a front wall, an insulator on a back face of a dash panel connecting front portion and a corresponding hinge pillar, and a connecting portion that connects to the partition.

8. The speaker disposition structure according to claim 7, wherein
   the connecting portion connects to a front extending portion, and
   the connecting portion and the front extending portion are disposed in front of the port opening so as to incline inward in the vehicle width direction, towards a front of the vehicle in a vehicle plan view.

9. A speaker disposition structure of a vehicle, the speaker disposition structure comprising:
   a hinge pillar extending in a vehicle up-down direction;
   a speaker box that holds a speaker, the speaker box being fixed to a lower portion of the hinge pillar; and
   a partition located on a vehicle width direction inner side of the speaker box, wherein
   a port opening is located in a front face of the speaker box,
   the front face of the speaker box, a dash panel, the hinge pillar and the partition surround a space having a length, from the port opening in a front-rear direction of the vehicle, that is greater than a maximum length of the port opening, and
   the partition is disposed such that, in front of the port opening, the partition is inclined inward in the vehicle width direction towards a front of the vehicle in a plan view.

10. The speaker disposition structure according to claim 9, wherein the partition is formed by a floor mat placed from above a floor panel to the vehicle width direction inner side of the speaker box.

11. The speaker disposition structure according to claim 9, wherein the space is formed from a lower side of the speaker box to a vicinity of an upper end location of the speaker box.

12. The speaker disposition structure according to claim 9, wherein the space is surrounded by a front wall, an insulator on a back face of a dash panel connecting front portion, the hinge pillar and a connecting portion that connects to the partition.

13. The speaker disposition structure according to claim 12, wherein
   the connecting portion connects to a front extending portion, and
   the connecting portion and the front extending portion are disposed in front of the port opening so as to incline inward in the vehicle width direction, towards a front of the vehicle in a vehicle plan view.

14. A speaker disposition structure, comprising:
   a hinge pillar;
   a speaker box that holds a speaker, the speaker box being fixed to the hinge pillar;
   a partition; and
   a port opening located in a front face of the speaker box, wherein
   the front face of the speaker box, a dash panel, the hinge pillar and the partition surround a space having a length that is greater than a maximum length of the port opening, and
   the space is surrounded by a front wall, an insulator on a back face of a dash panel connecting front portion, the hinge pillar and a connecting portion that connects to the partition.

15. The speaker disposition structure according to claim 14, wherein the space is formed from a lower side of the speaker box to a vicinity of an upper end location of the speaker box.

16. The speaker disposition structure according to claim 14, wherein the partition is inclined in front of the port opening.

17. The speaker disposition structure according to claim 14, wherein
   the connecting portion connects to a front extending portion, and the connecting portion and the front extending portion are disposed in front of the port opening.

\* \* \* \* \*